US008747605B2

(12) United States Patent
Lutz et al.

(10) Patent No.: US 8,747,605 B2
(45) Date of Patent: Jun. 10, 2014

(54) ONE-PART STRUCTURAL EPOXY RESIN ADHESIVES CONTAINING ELASTOMERIC TOUGHENERS CAPPED WITH PHENOLS AND HYDROXY-TERMINATED ACRYLATES OR HYDROXY-TERMINATED METHACRYLATES

(75) Inventors: Andreas Lutz, Glagenen (CH); Daniel Schneider, Wadenswil (CH)

(73) Assignee: Dow Global Technologies LLC, Midland, MI (US)

( * ) Notice: Subject to any disclaimer, the term of this patent is extended or adjusted under 35 U.S.C. 154(b) by 367 days.

(21) Appl. No.: 13/056,370

(22) PCT Filed: Aug. 11, 2009

(86) PCT No.: PCT/US2009/053357
§ 371 (c)(1),
(2), (4) Date: Jan. 28, 2011

(87) PCT Pub. No.: WO2010/019539
PCT Pub. Date: Feb. 18, 2010

(65) Prior Publication Data
US 2011/0126981 A1    Jun. 2, 2011

Related U.S. Application Data

(60) Provisional application No. 61/087,808, filed on Aug. 11, 2008.

(51) Int. Cl.
| C09J 163/00 | (2006.01) |
| C08F 283/00 | (2006.01) |
| C08F 283/10 | (2006.01) |
| C08G 59/14 | (2006.01) |
| C08L 63/00 | (2006.01) |
| C08L 75/00 | (2006.01) |
| C07C 69/34 | (2006.01) |
| C07C 69/52 | (2006.01) |

(52) U.S. Cl.
USPC .................. 156/330; 525/528; 560/199

(58) Field of Classification Search
USPC .................. 156/330; 525/528; 560/199
See application file for complete search history.

(56) References Cited

U.S. PATENT DOCUMENTS

| 4,552,817 A * | 11/1985 | Uustalu .................. 428/423.9 |
| 4,931,482 A | 6/1990 | Lamberts |
| 5,202,390 A | 4/1993 | Mulhaupt |
| 5,278,257 A | 1/1994 | Mulhaupt |
| 5,290,857 A | 3/1994 | Ashida |
| 5,686,509 A | 11/1997 | Nakayama |
| 6,776,869 B1 | 8/2004 | Schenkel |
| 6,800,157 B2 | 10/2004 | Tarbutton |
| 6,884,854 B2 | 4/2005 | Schoenfeld |
| 6,998,011 B2 | 2/2006 | Schoenfeld |
| 7,071,263 B2 | 7/2006 | Cheng |
| 7,557,168 B2 | 7/2009 | Lutz |
| 7,557,169 B2 | 7/2009 | Lutz |
| 7,615,595 B2 | 11/2009 | Lutz |
| 2003/0196753 A1 * | 10/2003 | Schoenfeld et al. .......... 156/330 |
| 2005/0022929 A1 | 2/2005 | Schoenfeld |
| 2005/0070634 A1 | 3/2005 | Lutz |
| 2005/0143496 A1 | 6/2005 | Mueller |
| 2005/0209401 A1 | 9/2005 | Lutz |
| 2005/0215730 A1 | 9/2005 | Schoenfeld |
| 2006/0205897 A1 | 9/2006 | Frick |
| 2006/0276601 A1 | 12/2006 | Lutz |
| 2007/0027233 A1 | 2/2007 | Yamaguchi |
| 2007/0066721 A1 | 3/2007 | Kramer |
| 2009/0048370 A1 | 2/2009 | Lutz |

FOREIGN PATENT DOCUMENTS

| EP | 1728825 A | 12/2006 |
| WO | 03/078163 A | 9/2003 |
| WO | 2005/007766 A | 1/2005 |

* cited by examiner

Primary Examiner — Michael Orlando

(57) ABSTRACT

Structural adhesives are prepared from an elastomeric toughener that contains urethane and/or urea groups, and have some terminal isocyanate groups that are capped with a phenol and other terminal isocyanate groups that are capped with a hydroxy-functional acrylate or a hydroxy-functional methacrylate. In certain embodiments, the presence of both types of capping on the toughener leads to higher impact peel strengths and a greater level of cohesive failure, than when the toughener is capped with a phenol an hydroxy-functional acrylate or hydroxy-functional methacrylate alone.

3 Claims, No Drawings

ONE-PART STRUCTURAL EPOXY RESIN ADHESIVES CONTAINING ELASTOMERIC TOUGHENERS CAPPED WITH PHENOLS AND HYDROXY-TERMINATED ACRYLATES OR HYDROXY-TERMINATED METHACRYLATES

This application claims priority from U.S. Provisional Application No. 61/087,808, filed 11 Aug. 2008.

This invention relates to an epoxy-based structural adhesive containing an elastomeric toughener having terminal isocyanate groups, some of which are blocked with phenols and others of which are blocked with a hydroxy-terminated acrylate or methacrylate compound Epoxy resin based adhesives are used in many applications. In the automotive industry, epoxy resin adhesives are used in many bonding applications, including metal-metal bonding in frame and other structures in automobiles. Some of these adhesives must strongly resist failure during vehicle collision situations. Adhesives of this type are sometimes referred to as "crash durable adhesives", or "CDAs".

In order to obtain the good balance of properties that are needed to meet stringent automotive performance requirements, epoxy adhesives are often formulated with various rubbers and/or "tougheners". These tougheners have blocked functional groups which, under the conditions of the curing reaction, can become de-blocked and react with an epoxy resin. Tougheners of this type are described, for example, in U.S. Pat. Nos. 5,202,390, 5,278,257, WO 2005/118734, U.S. Published Patent Application No. 2005/0070634, U.S. Published Patent Application No. 2005/0209401, U.S. Published Patent Application 2006/0276601 and EP-A-0 308 664.

A commonly used toughener is a polyurethane and/or polyurea which is capped with phenolic groups. These tougheners have been used with some success in CDA applications. However, there is in some cases a desire to further increase the strength of these adhesives and to develop an adhesive which, when cured, fails more often in a cohesive failure mode rather than an adhesive failure mode.

Another type of toughener is an acrylate-terminated polyurethane and/or polyurea. These have been described in WO 03/078163 for use in one-component epoxy adhesives, and in U.S. Pat. Nos. 5,232,996, 6,660,805 and US Published Patent Application 2004/0229990 for use in two-part adhesives. The acrylate-terminated tougheners generally perform more poorly than do the phenolic-terminated types in CDA applications. Their use tends to lead to poorer lap shear and impact peel strengths in the cured adhesives. The adhesives containing the acrylate-terminated tougheners also tend to fail in an adhesive mode rather than the more desirable cohesive mode.

A third type of toughener is described, for example, in EP 1,431,325, EP 1,498,441, EP 1,648,950 and EP 1,741,734. These tougheners are epoxide-terminated, rather than being terminated with phenols or acrylates. Similar to the acrylate-terminated types, adhesives containing these tougheners tend to have poorer adhesive strengths and to fail mainly in the less desired adhesive failure mode.

EP 1916269 describes reactive tougheners having both epoxide and phenolic terminal groups, in a molar ratio of up to 20:80. These are prepared by reacting an isocyanate-terminated prepolymer sequentially with a hydroxyl-containing epoxide compound and cashew nut oil or diallylbisphenol-A.

This invention is an elastomeric reactive toughener containing urethane and/or urea groups, and which has capped terminal isocyanate groups, wherein a portion of the isocyanate groups are capped with a phenol and another portion of the isocyanate groups are capped with a hydroxy-functional acrylate or a hydroxy-functional methacrylate.

In another aspect, this invention is a structural adhesive, comprising:
A) at least one epoxy resin;
B) a reactive toughener containing urethane and/or urea groups, and which has capped terminal isocyanate groups, wherein a portion of the isocyanate groups are capped with a phenol and another portion of the isocyanate groups are capped with a hydroxy-functional acrylate or a hydroxy-functional methacrylate; and
C) one or more epoxy curing agents.

The invention is also a method comprising applying the foregoing structural adhesive to the surfaces of two members, and curing the structural adhesive to form an adhesive bond between the two members. At least one and preferably both of the members are metals.

Cured adhesives containing this toughener often have excellent adhesive properties, including good lap shear strength and impact peel strength. The cured adhesives often are more likely to fail in a cohesive mode rather than are adhesives that contain only one type of the capping group. These advantages are seen most clearly in preferred embodiments in which from 1 to 20 percent of the terminal isocyanate groups are capped with a hydroxy-functional acrylate or hydroxy-functional methacrylate, and the remainder are capped with the phenol. In especially preferred embodiments, from 1.5 to 5 percent of the terminal isocyanate groups are capped with a hydroxy-functional acrylate or methacrylate, and the remainder are capped with the phenol.

The toughener of the invention is elastomeric, contains urethane and/or urea groups and has terminal isocyanate groups, some of which are capped with a phenol and some of which are capped with a hydroxy-functional acrylate or a hydroxy-functional methacrylate as described herein. For convenience herein, isocyanate groups capped with hydroxy-functional acrylate or methacrylate groups are collectively referred to by the shorthand "(meth)acrylate-capped" isocyanate groups. From 1 to 99% of the terminal isocyanate groups in the elastomeric toughener can be (meth)acrylate-capped, and, correspondingly, from 1 to 99% of the terminal isocyanate groups can be capped with the phenol.

In cases in which some of the terminal isocyanate groups are (meth)acrylate-capped, it is preferred that from 1 to 20% of the terminal isocyanate groups are (meth)acrylate-capped, with the rest being capped with the phenol. In this range, adhesive strength of the cured adhesive (i.e., lap shear strength and impact peel strength) tends to be significantly higher than when a greater proportion of the isocyanate groups are (meth)acrylate-capped. In addition, the failure mode in these cases tends to more highly favor the desired cohesive failure mode.

In some embodiments, from 1.5 to 5% of the terminal isocyanate groups are (meth)acrylate-capped, with the rest being capped with the phenol. In this range, it has been found, surprisingly, that adhesive strength of the cured adhesive can meet or even exceed that of an adhesive containing a toughener which is entirely phenol-capped. In addition, cohesive failure rates tend to be highest in this range, and often exceed those obtained by using an entirely phenol-capped toughener.

It will of course be recognized that the aforementioned proportions of phenol-capped isocyanate groups and (meth)acrylate-capped isocyanate groups refer to averages among the toughener molecules, and not to individual molecules specifically. Individual molecules may contain only phenol-capped isocyanate groups or only (meth)acrylate-capped isocyanate groups, or some of each of these types in any proportion. The phenol- and (meth)acrylate-capping on individual molecules will usually be distributed statistically, and may depend on the particular methods used to prepare the toughener.

The toughener suitably contains, on average, from about 1.5, preferably from about 2.0, to about 8, preferably to about 6, more preferably to about 4, capped isocyanate groups per molecule.

The toughener contains at least one internal segment that provides elastomeric character. It may contain two or more such segments. This segment may be a polyether segment or a segment of a butadiene homopolymer or copolymer. Segments of both types may be present in the toughener. Each polyether segment or segment of a butadiene homopolymer or copolymer preferably has a weight of from 800 to 5000 daltons, preferably from 1500 to 4000 daltons, measured by GPC.

The toughener suitably has a number average molecular weight from at least 3000, preferably at least 5000, to about 30,000, preferably to about 20,000 and more preferably to about 15,000, measured by GPC. The polydispersity (ratio of weight average molecular weight to number average molecular weight) is suitably from about 1 to about 4, preferably from about 1.5 to 2.5.

The toughener may also contain residues of a branching agent, a chain extender, or both.

The elastomeric toughener can be represented by the idealized structure (I)

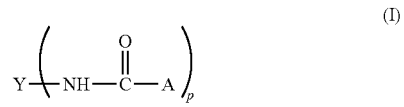

wherein p represents the average number of capped isocyanate groups per molecule. p is suitably at least 1.5, preferably at least 2, to 8, preferably to 6, more preferably to 4. Each A in structure I represents the residue, after removal of a hydrogen atom, from (1) an amino group of a primary aliphatic, cycloaliphatic, heterocyclic or araliphatic amine; an amino group of a secondary aliphatic, cycloaliphatic, heterocyclic or araliphatic amine or a hydroxyl group of a hydroxy-functional acrylate or methacrylate, or (2) a phenol.

On average, the elastomeric toughener in structure I will include some of both of type (1) and type (2) A groups. Individual molecules of the elastomeric toughener may have only type (1) A groups, only type (2) A groups, or both type (1) and type (2) A groups. The type (1) and (2) A groups can be represented by structures II and III, respectively:

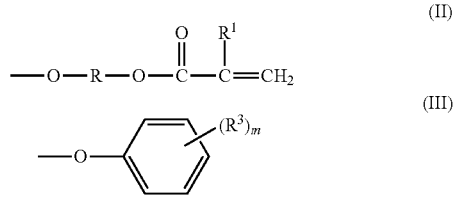

In structure II, $R^1$ is hydrogen or methyl. In structure III, m is a number from 0 to 5. Each $R^3$ represents a substituent group, bonded to a carbon atom on the aromatic ring. Each $R^3$ may be a hydroxyl group; an alkyl group, which may be linear, branched or cycloalkyl; an alkenyl group such as allyl; an aromatic group such as phenyl, alkyl-substituted phenyl, alkenyl-substituted phenyl and the like; an aryl-substituted alkyl group; a phenol-substituted alkyl group, wherein the phenol substituent group may itself be unsubstituted or substituted; and the like.

In structure I, Y is the residue of an isocyanate-terminated prepolymer after removal of the terminal isocyanate groups. Y contains at least one elastomeric segment. Each elastomeric segment preferably has a relatively high weight, preferably a weight of at least 800 daltons. The weight of the elastomeric segment may be as high as 5000 daltons, and is preferably from 1500 to 4000 daltons, in each case. This elastomeric segment is preferably linear or at most slightly branched. The elastomeric segment(s) each may be a polyether segment or a segment of a butadiene homopolymer or copolymer, as described before. The Y group may contain one or more segments of each type. The Y group may contain urethane and/or urea groups, and may in addition contain residues (after removal of hydroxyl or amino groups, as the case may be) of one or more crosslinkers or chain extenders. Crosslinkers, for purposes of this invention, are polyol or polyamine compounds having a molecular weight of up to 750, preferably from 50 to 500, and at least three hydroxyl, primary amino and/or secondary amino groups per molecule. Crosslinkers provide branching to the Y group, and are useful to increase the functionality (i.e., number of capped isocyanate groups per molecule) of the toughener. Chain extenders, for purposes of this invention, are polyol or polyamine compounds having a molecular weight of up to 750, preferably from 50 to 500, and two hydroxyl, primary amino and/or secondary amino groups per molecule. Chain extenders help to increase the molecular weight of the toughener without increasing functionality.

The reactive toughener can be prepared by forming an isocyanate-terminated prepolymer, and then capping some of the terminal isocyanate groups with a phenol compound and the remainder of the terminal isocyanate groups with a hydroxy-functional acrylate and/or a hydroxy-functional methacrylate compound. The isocyanate-terminated prepolymer can be prepared by reaction of one or more polyol or polyamine compounds with a stoichiometric excess of a polyisocyanate compound, preferably a diisocyanate compound. At least one of the polyol or polyamine compounds imparts elastomeric properties to the toughener, and preferably includes a relatively high weight elastomeric segment, especially a polyether segment or a segment of a butadiene homopolymer or copolymer, as described before.

The polyisocyanate may be an aromatic polyisocyanate, but it is preferably an aliphatic polyisocyanate such as isophorone diisocyanate, hexamethylene diisocyanate, hydrogenated toluene diisocyanate, hydrogenated methylene diphenylisocyanate ($H_{12}MDI$), and the like.

In the simplest case, only one polyol or polyamine is used to make the prepolymer. In such a case, the polyol or polyamine preferably contains at least one relatively high weight elastomeric segment as described before, to impart elastomeric properties to the prepolymer. However, it is also possible to use a mixture of polyols or polyamines to make the prepolymer. It is preferred that at least 50%, more preferably at least 80%, and even more preferably at least 90%, by weight of the polyol or polyamine materials used to make the prepolymer include a relatively high weight elastomeric segment as described before.

Other polyols and polyamines that can be used in combination with the elastomeric polyol or polyamine(s) include crosslinkers and chain extenders having a molecular weight of up to about 750. More preferred are aliphatic polyols and polyamines having an equivalent weight of up to 150 and from 2 to 4, especially from 2 to 3, hydroxyl and/or primary or secondary amino groups. Examples of these materials include polyols such as trimethylolpropane, glycerine, trimethylolethane, ethylene glycol, diethylene glycol, propylene glycol, dipropylene glycol, sucrose, sorbitol, pentaerythritol, ethylene diamine, triethanolamine, monoethanolamine, diethanolamine, piperazine, aminoethylpiperazine, compounds having two or more phenolic hydroxyl groups such resorcinol, catechol, hydroquinone, bisphenol, bisphenol A, bisphenol AP (1,1-bis(4-hydroxylphenyl)-1-phenyl ethane), bisphenol F, bisphenol K, bisphenol M, tetramethylbiphenol and o,o'-diallyl-bisphenol A, and the like.

When a mixture of polyols/or polyamines is used to make the prepolymer, the polyisocyanate compound can be reacted all at once with the mixture to produce the prepolymer in a single step. Alternatively, the polyisocyanate may be reacted with each polyol or polyamine compound sequentially, or with various subsets thereof. The latter approach is often useful to produce a prepolymer having a more defined molecular structure.

Thus, for example, a prepolymer can be formed from one or more higher equivalent weight polyols or polyamines having one or more elastomeric segments, as described before, and one or more chain extenders or crosslinkers. In such a case, the prepolymer can be made by reacting all of the polyols and/or polyamines, including chain extenders and/or crosslinkers, at once with the polyisocyanate. Alternatively, a crosslinker or chain extender can be reacted first with the polyisocyanate, followed by reaction with the higher equivalent weight polyol and/or polyamine, or vice versa. In another approach, the higher equivalent weight polyol and/or polyamine, or mixture thereof with a crosslinker, is first reacted with the polyisocyanate, and the resulting product is then reacted with a chain extender or additional crosslinker to advance the molecular weight.

The proportions of starting materials are suitably selected so that the prepolymer has an isocyanate content of from 0.5 to 6% by weight, more preferably from 1 to 5% by weight and even more preferably from 1.5 to 4% by weight. In terms of isocyanate equivalent weight, a preferred range is from 700 to 8400, a more preferred range is from 840 to 4200, and an even more preferred range is from 1050 to 2800.

The elastomeric toughener is then prepared from the prepolymer by reacting the isocyanate prepolymer with a capping agent which includes (1) a phenol compound and (2) a hydroxy-functional acrylate or a hydroxy-functional methacrylate compound. These materials can be reacted with the prepolymer either sequentially (in either order) or simultaneously.

If the two types of capping agents are reacted sequentially with the prepolymer, it is preferred to react the prepolymer first with the type of capping agent that will be used in the smaller molar proportion, followed by capping with the type of other capping agent. In these cases, individual molecules may contain only one type of capping group, and other individual molecules may contain both types of capping groups, but the toughener as a whole will contain both types of capping groups. It is also possible to cap part of the toughener with one of the capping agents and separately cap another part of the prepolymer with the other capping agent. The two capped prepolymers are then combined to form the reactive toughener of the invention. In this case, some individual molecules in the elastomeric toughener will have only one type of capping group, and other individual molecules will have the other type of capping group.

The proportions of starting materials are selected so that at least one mole of capping agent is provided per equivalent of isocyanate group on the prepolymer. Such a ratio of starting materials allows for the capping reaction to proceed until the isocyanate groups are essentially all consumed, without significantly advancing the prepolymer.

The phenolic compound contains at least one phenolic hydroxyl group, i.e., a hydroxyl group bonded directly to a carbon atom of an aromatic ring. The phenolic compound may have two or more phenolic hydroxyl groups, but preferably contains only one phenolic hydroxyl group. The phenolic compound may contain other substituent groups, but these preferably are not reactive with an isocyanate group under the conditions of the capping reaction. Alkenyl groups, especially allyl groups, are of particular interest. Other suitable substituent groups include alkyl groups, which may be linear, branched or cycloalkyl; aromatic groups such as phenyl, alkyl-substituted phenyl, alkenyl-substituted phenyl and the like; aryl-substituted alkyl groups; and phenol-substituted alkyl groups, wherein the phenol substituent group may itself be unsubstituted or substituted. Examples of suitable phenolic compounds include phenol, cresol, allylphenol (especially o-allylphenol), resorcinol, catechol, hydroquinone, bisphenol, bisphenol A, bisphenol AP (1,1-bis(4-hydroxylphenyl)-1-phenyl ethane), bisphenol F, bisphenol K, bisphenol M, tetramethylbiphenol and o,o'-diallyl-bisphenol A.

Suitable hydroxy-functional acrylate or methacrylate compounds include acrylate or methacrylate compounds having one or more, especially one, hydroxyl group. Hydroxyl-functional acrylate and methacrylate compounds are preferred. Among the suitable capping agents of this type are 2-hydroxyethylacrylate, 2-hydroxypropylacrylate, 4-hydroxybutylacrylate, 2-hydroxybutylacrylate, 2-aminopropylacrylate, 2-hydroxyethylmethacrylate, 2-hydroxypropylmethacrylate, 4-hydroxybutylmethacrylate, 2-hydroxybutylmethacrylate, and the like.

The prepolymer-forming and capping reactions are generally performed by mixing the starting materials in the presence of a catalyst for the reaction of isocyanate groups with hydroxyl and/or amino groups, as the case may be. It is not usually necessary to catalyze a reaction between the isocyanate groups and an amine. The reaction mixture will typically be heated to an elevated temperature, and the reaction continued until the isocyanate content is reduced to the desired level (approximately 0% for the capping reaction, somewhat higher levels for the prepolymer as described above).

The toughener should constitute at least 5 weight percent of the adhesive composition. Better results are typically seen when the amount of toughener is at least 8 weight percent or at least 10 weight percent. The toughener may constitute up to 45 weight percent thereof, preferably up to 30 weight percent and more preferably up to 25 weight percent. The amount of toughener that is needed to provide good properties, particularly good low temperature properties, in any particular adhesive composition may depend somewhat on the other components of the composition, and may depend somewhat on the molecular weight of the toughener.

The structural adhesive contains at least one epoxy resin. It is preferred that at least a portion of the epoxy resin is not rubber-modified. A non-rubber-modified epoxy resin may be added to the structural adhesive as a separate component, i.e., not as a component of a rubber-modified epoxy resin or a dispersion of a core-shell rubber, as described below. In some embodiments of the invention, a core-shell rubber product is used, which may be dispersed in some quantity of epoxy resin. Some amount of non-rubber-modified epoxy resin may be brought into the structural adhesive in that manner. In other embodiments, a rubber-modified epoxy resin product used as a component of the structural adhesive may also contain a certain amount of epoxy resin which is not reacted with the rubber (and thus is not rubber-modified). Some non-rubber-modified epoxy resin may be brought into the adhesive in that manner as well.

A wide range of epoxy resins can be used as a non-rubber-modified epoxy resin, including those described at column 2 line 66 to column 4 line 24 of U.S. Pat. No. 4,734,332, incorporated herein by reference.

Suitable epoxy resins include the diglycidyl ethers of polyhydric phenol compounds such as resorcinol, catechol, hydroquinone, bisphenol, bisphenol A, bisphenol AP (1,1-bis(4-hydroxylphenyl)-1-phenyl ethane), bisphenol F, bisphenol K and tetramethylbiphenol; diglycidyl ethers of aliphatic glycols and polyether glycols such as the diglycidyl ethers of $C_{2-24}$ alkylene glycols and poly(ethylene oxide) or poly(propylene oxide) glycols; polyglycidyl ethers of phenol-formaldehyde novolac resins, alkyl substituted phenol-formaldehyde resins (epoxy novolac resins), phenol-hydroxybenzaldehyde resins, cresol-hydroxybenzaldehyde resins, dicyclopentadiene-phenol resins and dicyclopentadiene-substituted phenol resins; and any combination of any two or more thereof.

Suitable epoxy resins include diglycidyl ethers of bisphenol A resins such as are sold by Dow Chemical under the designations D.E.R.® 330, D.E.R.® 331, D.E.R.® 332, D.E.R.® 383, D.E.R. 661 and D.E.R.® 662 resins.

Commercially available diglycidyl ethers of polyglycols that are useful include those sold as D.E.R.® 732 and D.E.R.® 736 by Dow Chemical.

Epoxy novolac resins can be used. Such resins are available commercially as D.E.N.® 354, D.E.N.® 431, D.E.N.® 438 and D.E.N.® 439 from Dow Chemical.

Other suitable additional epoxy resins are cycloaliphatic epoxides. A cycloaliphatic epoxide includes a saturated carbon ring having an epoxy oxygen bonded to two vicinal atoms in the carbon ring, as illustrated by the following structure IV:

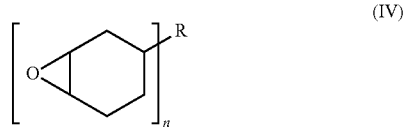

(IV)

wherein R is an aliphatic, cycloaliphatic and/or aromatic group and n is a number from 1 to 10, preferably from 2 to 4. When n is 1, the cycloaliphatic epoxide is a monoepoxide. Di- or polyepoxides are formed when n is 2 or more. Mixtures of mono-, di- and/or polyepoxides can be used. Cycloaliphatic epoxy resins as described in U.S. Pat. No. 3,686,359, incorporated herein by reference, may be used in the present invention. Cycloaliphatic epoxy resins of particular interest are (3,4-epoxycyclohexyl-methyl)-3,4-epoxy-cyclohexane carboxylate, bis-(3,4-epoxycyclohexyl) adipate, vinylcyclohexene monoxide and mixtures thereof.

Other suitable epoxy resins include oxazolidone-containing compounds as described in U.S. Pat. No. 5,112,932. In addition, an advanced epoxy-isocyanate copolymer such as those sold commercially as D.E.R. 592 and D.E.R. 6508 (Dow Chemical) can be used.

The non-rubber-modified epoxy resin preferably is a bisphenol-type epoxy resin or mixture thereof with up to 10 percent by weight of another type of epoxy resin. The most preferred epoxy resins are bisphenol-A based epoxy resins and bisphenol-F based epoxy resins. These can have average epoxy equivalent weights of from about 170 to 600 or more, preferably from 225 to 400.

An especially preferred non-rubber-modified epoxy resin is a mixture of a diglycidyl ether of a polyhydric phenol, preferably bisphenol-A or bisphenol-F, having an epoxy equivalent weight of from 170 to 299, especially from 170 to 225, and a second diglycidyl ether of a polyhydric phenol, again preferably bisphenol-A or bisphenol-F, this one having an epoxy equivalent weight of at least 300, preferably from 310 to 600. The proportions of the two resins are preferably such that the mixture of the two resins has an average epoxy equivalent weight of from 225 to 400. The mixture optionally may also contain up to 20%, preferably up to 10%, of one or more other non-rubber-modified epoxy resins.

A non-rubber-modified epoxy resin preferably will constitute at least about 25 weight percent of the structural adhesive, more preferably at least about 30 weight percent, and still more preferably at least about 35 part weight percent. The non-rubber-modified epoxy resin may constitutes up to about 60 weight percent of the structural adhesive, more preferably up to about 50 weight percent. These amounts include amounts of non-rubber-modified epoxy resin (if any) that may be brought into the composition with any core-shell rubber and/or any liquid rubber-modified epoxy resin(s) as may be used.

The structural adhesive also contains a curing agent. For the preferred one-component adhesive products, the curing agent preferably is selected together with any catalysts such that the adhesive cures rapidly when heated to a temperature of 80° C. or greater, preferably 140° C. or greater, but cures very slowly if at all at room temperature (~22° C.) and temperatures up to at least 50° C. Suitable such curing agents include materials such as boron trichloride/amine and boron trifluoride/amine complexes, dicyandiamide, melamine, diallylmelamine, guanamines such as acetoguanamine and benzoguanamine, aminotriazoles such as 3-amino-1,2,4-triazole, hydrazides such as adipic dihydrazide, stearic dihydrazide, isophthalic dihydrazide, semicarbazide, cyanoacetamide, and aromatic polyamines such as diaminodiphenylsulphones. The use of dicyandiamide, isophthalic acid dihydrazide, adipic acid dihydrazide and/or 4,4'-diaminodiphenylsulphone is particularly preferred.

The curing agent is used in an amount sufficient to cure the composition. Typically, enough of the curing agent is provided to consume at least 80% of the epoxide groups present in the composition. A large excess over that amount needed to consume the epoxide groups is generally not needed. Preferably, the curing agent constitutes at least about 1.5 weight percent of the structural adhesive, more preferably at least about 2.5 weight percent and even more preferably at least 3.0 weight percent. The curing agent preferably constitutes up to about 15 weight percent of the structural adhesive composition, more preferably up to about 10 weight percent, and most preferably up to about 8 weight percent.

The structural adhesive will in most cases contain a catalyst to promote the cure of the adhesive, i.e. the reaction of epoxy groups with epoxide-reactive groups on the curing agent and other components of the adhesive. Among preferred epoxy catalysts are ureas such as p-chlorophenyl-N,N-dimethylurea (Monuron), 3-phenyl-1,1-dimethylurea (Phenuron), 3,4-dichlorophenyl-N,N-dimethylurea (Diuron), N-(3-chloro-4-methylphenyl)-N',N'-dimethylurea (Chlortoluron), tert-acryl- or alkylene amines like benzyldimethylamine, 2,4,6-tris(dimethylaminomethyl)phenol, piperidine or derivates thereof, imidazole derivates, in general $C_1$-$C_{12}$ alkylene imidazole or N-arylimidazols, such as 2-ethyl-2-methylimidazol, or N-butylimidazol, 6-caprolactam, a preferred catalyst is 2,4,6-tris(dimethylaminomethyl)phenol integrated into a poly(p-vinylphenol) matrix (as described in European patent EP 0 197 892). The catalyst may be encapsulated or otherwise be a latent type which becomes active only upon exposure to elevated temperatures.

Preferably, the catalyst is present in an amount of at least about 0.1 weight percent of the structural adhesive, and more preferably at least about 0.5 weight percent. Preferably, the catalyst constitutes up to about 2 weight percent of the structural adhesive, more preferably up to about 1.0 weight percent, and most preferably up to about 0.7 weight percent.

The structural adhesive of the invention may include at least one liquid rubber-modified epoxy resin. A rubber-modified epoxy resin for purposes of this invention is a reaction product of an epoxy resin and at least one liquid rubber that has epoxide-reactive groups, such as amino or preferably carboxyl groups. The resulting adduct has reactive epoxide groups which can be cured further when the structural adhesive is cured. It is preferred that at least a portion of the liquid rubber has a glass transition temperature ($T_g$) of −40° C. or lower, especially −50° C. or lower. Preferably, each of the rubbers (when more than one is used) has a glass transition temperature of −25° C. or lower. The rubber $T_g$ may be as low as −100° C. or even lower.

The liquid rubber is preferably a homopolymer or copolymer of a conjugated diene, especially a diene/nitrile copolymer. The conjugated diene rubber is preferably butadiene or isoprene, with butadiene being especially preferred. The preferred nitrile monomer is acrylonitrile. Preferred copolymers are butadiene-acrylonitrile copolymers. The rubbers preferably contain, in the aggregate, no more than 30 weight percent polymerized unsaturated nitrile monomer, and preferably no more than about 26 weight percent polymerized nitrile monomer.

The rubber preferably contains from about 1.5, more preferably from about 1.8, to about 2.5, more preferably to about 2.2, of epoxide-reactive terminal groups per molecule, on average. Carboxyl-terminated rubbers are preferred. The molecular weight ($M_n$) of the rubber is suitably from about 2000 to about 6000, more preferably from about 3000 to about 5000.

Suitable carboxyl-functional butadiene and butadiene/acrylonitrile rubbers are commercially available from Noveon under the tradenames Hycar® 2000X162 carboxyl-terminated butadiene homopolymer, Hycar® 1300X31, Hycar® 1300X8, Hycar® 1300X13, Hycar® 1300X9 and Hycar® 1300X18 carboxyl-terminated butadiene/acrylonitrile copolymers. A suitable amine-terminated butadiene/acrylonitrile copolymer is sold under the tradename Hycar® 1300X21.

The rubber is formed into an epoxy-terminated adduct by reaction with an excess of an epoxy resin. Enough of the epoxy resin is provided to react with substantially all of the epoxide-reactive groups on the rubber and to provide free epoxide groups on the resulting adduct without significantly advancing the adduct to form high molecular weight species. A ratio of at least two equivalents of epoxy resin per equivalent of epoxy-reactive groups on the rubber is preferred. More preferably, enough of the epoxy resin is used that the resulting product is a mixture of the adduct and some free epoxy resin. Typically, the rubber and an excess of the polyepoxide are mixed together with a polymerization catalyst and heated to a temperature of about 100 to about 250° C. in order to form the adduct. Suitable catalysts include those described before. Preferred catalysts for forming the rubber-modified epoxy resin include phenyl dimethyl urea and triphenyl phosphine.

A wide variety of epoxy resins can be used to make the rubber-modified epoxy resin, including any of those described above. The epoxy resin may be the same or different from that used to prepare the rubber-modified epoxy resin. Preferred polyepoxides are liquid or solid glycidyl ethers of a bisphenol such as bisphenol A or bisphenol F. Halogenated, particularly brominated, resins can be used to impart flame retardant properties if desired. Liquid epoxy resins (such as DER™ 330 and DER™ 331 resins, which are diglycidyl ethers of bisphenol A available from The Dow Chemical Company) are especially preferred for ease of handling.

The rubber-modified epoxy resin(s), if present at all, may constitute about 1 weight percent of the structural adhesive or more, preferably at least about 2 weight percent. The rubber-modified epoxy resin may constitute up to about 25 weight percent of the structural adhesive, more preferably up to about 20 weight percent, and even more preferably up to about 15 weight percent.

The structural adhesive of the invention may contain one or more core-shell rubbers. The core-shell rubber is a particulate material having a rubbery core. The rubbery core preferably has a $T_g$ of less than −20° C., more preferably less than −50° C. and even more preferably less than −70° C. The $T_g$ of the rubbery core may be well below −100° C. The core-shell rubber also has at least one shell portion that preferably has a $T_g$ of at least 50° C. By "core", it is meant an internal portion of the core-shell rubber. The core may form the center of the core-shell particle, or an internal shell or domain of the core-shell rubber. A shell is a portion of the core-shell rubber that is exterior to the rubbery core. The shell portion (or portions) typically forms the outermost portion of the core-shell rubber particle. The shell material is preferably grafted onto the core or is crosslinked or both. The rubbery core may constitute from 50 to 95%, especially from 60 to 90%, of the weight of the core-shell rubber particle.

The core of the core-shell rubber may be a polymer or copolymer of a conjugated diene such as butadiene, or a lower alkyl acrylate such as n-butyl-, ethyl-, isobutyl- or 2-ethylhexylacrylate. The core polymer may in addition contain up to 20% by weight of other copolymerized monounsaturated monomers such as styrene, vinyl acetate, vinyl chloride, methyl methacrylate, and the like. The core polymer is optionally crosslinked. The core polymer optionally contains up to 5% of a copolymerized graft-linking monomer having two or more sites of unsaturation of unequal reactivity, such as diallyl maleate, monoallyl fumarate, allyl methacrylate, and the like, at least one of the reactive sites being non-conjugated.

The core polymer may also be a silicone rubber. These materials often have glass transition temperatures below −100° C. Core-shell rubbers having a silicone rubber core include those commercially available from Wacker Chemie, Munich, Germany, under the trade name Genioperl™.

The shell polymer, which is optionally chemically grafted or crosslinked to the rubber core, is preferably polymerized from at least one lower alkyl methacrylate such as methyl-, ethyl- or t-butyl methacrylate. Homopolymers of such methacrylate monomers can be used. Further, up to 40% by weight of the shell polymer can be formed from other monovinylidene monomers such as styrene, vinyl acetate, vinyl chloride, methyl acrylate, ethyl acrylate, butyl acrylate, and the like. The molecular weight of the grafted shell polymer is generally between 20,000 and 500,000.

A preferred type of core-shell rubber has reactive groups in the shell polymer which can react with an epoxy resin or an epoxy resin hardener. Glycidyl groups such as are provided by monomers such as glycidyl methacrylate are suitable.

A particularly preferred type of core-shell rubber is of the type described in EP 1 632 533 A1. Core-shell rubber particles as described in EP 1 632 533 A1 include a crosslinked rubber core, in most cases being a crosslinked copolymer of butadiene, and a shell which is preferably a copolymer of styrene, methyl methacrylate, glycidyl methacrylate and optionally acrylonitrile. The core-shell rubber is preferably dispersed in a polymer or an epoxy resin, also as described in EP 1 632 533 A1.

Preferred core-shell rubbers include those sold by Kaneka Corporation under the designation Kaneka Kane Ace, including Kaneka Kane Ace MX 156 and Kaneka Kane Ace MX 120 core-shell rubber dispersions. The products contain the core-shell rubber particles pre-dispersed in an epoxy resin, at a concentration of approximately 25%. The epoxy resin contained in those products will form all or part of the non-rubber-modified epoxy resin component of the structural adhesive of the invention.

The core-shell rubber particles can constitute from 0 to 15 weight percent of the structural adhesive.

The total rubber content of the structural adhesive of the invention can range from as little as 0 weight percent to as high as 30 weight percent. A preferred rubber content for a crash durable adhesive is from 1 weight percent to as much as 20 weight percent, preferably from 2 to 15 weight percent and more preferably from 4 to 15 weight percent.

Total rubber content is calculated for purposes of this invention by determining the weight of core-shell rubber (if any), plus the weight contributed by the liquid rubber portion of any rubber-modified epoxy resin as may be used. No portion of the elastomeric toughener is considered in calculating total rubber content. In each case, the weight of unreacted (non-rubber-modified) epoxy resins and/or other carriers, diluents, dispersants or other ingredients that may be contained in the core-shell rubber product or rubber-modified epoxy resin is not included. The weight of the shell portion of the core-shell rubber is counted as part of the total rubber content for purposes of this invention.

The structural adhesive of the invention may contain various other optional components.

The presence of acrylate or methacrylate capping groups in the toughener gives rise to the possibility of at least partially curing the structural adhesive through a free radical polymerization of the carbon-carbon double bonds in those groups. Therefore, a free radical initiator may be included in the structural adhesive. The free radical initiator should be a latent type that is activated at an elevated temperature, which is preferably from about 50° C. to about 150° C.

If the free radical initiator is activated at a lower temperature than that at which the epoxy resin cures, it becomes possible to conduct a partial cure of the structural adhesive through selective polymerization of the acrylate or methacrylate capping groups. This may be done, for instance, to increase the viscosity of the adhesive after application or to partially gel it, to form a temporary bond which can hold the substrates together until the final cure can be performed. In such a case, the free radical initiator preferably is activated by heating it to a temperature of from 80° C. to 130° C., more preferably from 100° C. to 120° C.

Acrylate or methacrylate capping groups also can be polymerized by exposure to activating radiation such as ultraviolet radiation, with or without the presence of a free radical initiator.

The speed and selectivity of the cure can be enhanced and adjusted by incorporating a monomeric or oligomeric, addition polymerizable, ethylenically unsaturated material into the structural adhesive. This material should have a molecular weight of less than about 1500. This material may be, for example, an acrylate or methacrylate compound, an unsaturated polyester, a vinyl ester resin, or an epoxy adduct of an unsaturated polyester resin. A free radical initiator as described above can be included in the structural adhesive as well, in order to provide a source of free radicals to polymerize this material. The inclusion of an ethylenically unsaturated material of this type again provides the possibility of effecting a partial cure of the structural adhesive through selective polymerization of the ethylenic unsaturation. This additional ethylenically unsaturated material can copolymerize with the toughener.

At least one filler, rheology modifier and/or pigment is preferably present in the structural adhesive. These can perform several functions, such as (1) modifying the rheology of the adhesive in a desirable way, (2) reducing overall cost per unit weight, (3) absorbing moisture or oils from the adhesive or from a substrate to which it is applied, and/or (4) promoting cohesive, rather than adhesive, failure. Examples of these materials include calcium carbonate, calcium oxide, talc, carbon black, textile fibers, glass particles or fibers, aramid pulp, boron fibers, carbon fibers, mineral silicates, mica, powdered quartz, hydrated aluminum oxide, bentonite, wollastonite, kaolin, fumed silica, silica aerogel or metal powders such as aluminum powder or iron powder. Another filler of particular interest is a microballon having an average particle size of up to 200 microns and density of up to 0.2 g/cc. The particle size is preferably about 25 to 150 microns and the density is preferably from about 0.05 to about 0.15 g/cc. Heat expandable microballoons which are suitable for reducing density include those commercially available from Dualite Corporation under the trade designation Dualite™ and those sold by Akzo Nobel under the trade designation Expancel™.

Fillers, pigment and rheology modifiers are preferably are used in an aggregate amount of about 2 parts per hundred parts of adhesive composition or greater, more preferably about 5 parts per hundred parts of adhesive composition or greater. They preferably are present in an amount of up to about 25 weight percent of the structural adhesive, more preferably up to about 20 weight percent, and most preferably up to about 15 weight percent.

The structural adhesive can further contain other additives such as diluents, plasticizers, extenders, pigments and dyes, fire-retarding agents, thixotropic agents, expanding agents, flow control agents, adhesion promoters and antioxidants. Suitable expanding agents include both physical and chemical type agents. The adhesive may also contain a thermoplastic powder such as polyvinylbutyral or a polyester polyol, as described in WO 2005/118734.

Various preferred adhesives of the invention are as follows:

A. An adhesive that includes at least one diglycidyl ether of a polyhydric phenol; a liquid rubber-modified epoxy resin, a core-shell rubber or both a liquid rubber-modified epoxy resin and a core-shell rubber; and from about 8 to 30 weight percent of the toughener of the invention.

B. An adhesive as in A, wherein from 1 to 20% of the terminal isocyanate groups of the toughener are (meth)acrylate- and/or epoxide-capped, and the remainder of terminal isocyanate groups are capped with a phenol.

C. An adhesive as in A or B, wherein the diglycidyl ether of a polyhydric phenol is a diglycidyl ether of bisphenol A or bisphenol F, and has an equivalent weight of from 170 to 299.

D. An adhesive as in A or B, which contains a mixture of a diglycidyl ether of a polyhydric phenol, preferably bisphenol-A or bisphenol-F, having an epoxy equivalent weight of from 170 to 299, especially from 170 to 225, and a second diglycidyl ether of a polyhydric phenol, again preferably bisphenol-A or bisphenol-F, this one having an epoxy equivalent weight of at least 300, preferably from 310 to 600. The proportions of the two resins are preferably such that the mixture of the two resins has an average epoxy equivalent weight of from 225 to 400.

E. An adhesive as in A, B, C, or D, wherein the toughener contains one or more polyether segments of from 800 to 5000 daltons each.

F. An adhesive as in A, B, C, D or E, which is a one-part adhesive that contains a curing agent and a catalyst, and which cures rapidly at a temperature of 140° C. or higher but slowly if at all at a temperature of 80° C. or lower.

G. An adhesive as in A, B, C, D, E or F, wherein from 1.5 to 5% of the terminal isocyanate groups of the toughener are (meth)acrylate-capped, and the remainder of terminal isocyanate groups are capped with a phenol.

The adhesive composition can be applied by any convenient technique. It can be applied cold or be applied warm if desired. It can be applied by extruding it from a robot into bead form on the substrate, it can be applied using mechanical application methods such as a caulking gun, or any other manual application means, and it can also be applied using jet spraying methods such as a steaming method or a swirl technique. The swirl technique is applied using an apparatus well known to one skilled in the art such as pumps, control systems, dosing gun assemblies, remote dosing devices and application guns. Preferably, the adhesive is applied to the substrate using a jet spraying or streaming process. Generally, the adhesive is applied to one or both substrates. The substrates are contacted such that the adhesive is located between the substrates to be bonded together.

After application, the structural adhesive is cured by heating to a temperature at which the curing agent initiates cure of the epoxy resin composition. Generally, this temperature is about 80° C. or above, preferably about 140° C. or above. Preferably, the temperature is about 220° C. or less, and more preferably about 180° C. or less.

It is possible to cure the structural adhesive in stages. The first stage is conducted at a somewhat lower temperature, such as from 50° C. to 100° C., preferably from 50 to 80° C. Ethylenic unsaturation (including acrylate or methacrylate capping groups on the reactive toughener) can polymerize at these temperatures if a source of free radicals is present, to partially cure the structural adhesive. The partially cured adhesive then can be subjected to a higher temperature at which the epoxy resin can react with the epoxy curing agent to complete the cure.

The adhesive of the invention can be used to bond a variety of substrates together including wood, metal, coated metal, aluminum, a variety of plastic and filled plastic substrates, fiberglass and the like. In one preferred embodiment, the adhesive is used to bond parts of automobiles together or parts to automobiles. Such parts can be steel, coated steel, galvanized steel, aluminum, coated aluminum, plastic and filled plastic substrates.

An application of particular interest is bonding of automotive frame components to each other or to other components. The frame components are often metals such as cold rolled steel, galvanized metals, or aluminum. The components that are to be bonded to the frame components can also be metals as just described, or can be other metals, plastics, composite materials, and the like.

Adhesion to brittle metals such as galvaneal is of particular interest in the automotive industry. Galvaneal tends to have a zinc-iron surface that is somewhat rich in iron content and is brittle for that reason. A particular advantage of this invention is that the cured adhesive bonds well to brittle metals such as galvaneal. Another application of particular interest is the bonding of aerospace components, particularly exterior metal components or other metal components that are exposed to ambient atmospheric conditions during flight.

Assembled automotive frame members are usually coated with a coating material that requires a bake cure. The coating is typically baked at temperatures that may range from 140° C. to over 200° C. In such cases, it is often convenient to apply the structural adhesive to the frame components, then apply the coating, and cure the adhesive at the same time the coating is baked and cured.

The adhesive composition once cured preferably has a Young's modulus of about 1000 MPa as measured according to DIN EN ISO 527-1. Preferably the Young's modulus is about 1200 MPa or greater, more preferably at least 1500 MPa. Preferably, the cured adhesive demonstrates a tensile strength of about 20 MPa or greater, more preferably about 25 MPa or greater, and most preferably about 35 MPa or greater. Preferably, the lap shear strength of a 1.5 mm thick cured adhesive layer on cold rolled steel (CRS) and galvaneal is about 15 MPa or greater, more preferably about 20 MPa or greater, and most preferably about 25 MPa or greater measured according to DIN EN 1465.

The cured adhesive of the invention demonstrates excellent adhesive properties (such as lap shear strength and impact peel strength) over a range of temperatures down to −40° C. or lower.

The following examples are provided to illustrate the invention but are not intended to limit the scope thereof. All parts and percentages are by weight unless otherwise indicated.

TOUGHENER EXAMPLES 1-9 AND COMPARATIVE TOUGHENERS A AND B

A prepolymer is prepared by mixing, under nitrogen, 77.7 parts of a 2000 molecular weight polytetrahydrofuran, 0.5 part of trimethylolpropane and 0.2 part of a tin catalyst and heating at 85° C. until a homogeneous mixture is obtained. 13 parts hexamethylene diisocyanate are added and the mixture is allowed to react under nitrogen at 85° C. for 45 minutes. 0.01 part of an antioxidant is added, and the mixture is stirred for another five minutes at 85° C. The resulting prepolymer has an isocyanate content of 3.0%.

The prepolymer is then mixed with 0.1 part of 2-hydroxyethylmethacrylate and 8.7 parts of o-allylphenol under nitrogen. The mixture is allowed to stir for 20 minutes to allow the capping reaction to complete. The resulting toughener (Example 1) is degassed under vacuum. 1.5% of the terminal isocyanate groups of Toughener Example 1 are methacrylate-capped, and 98.5% of the terminal isocyanate groups are o-allylphenol-capped.

Toughener Examples 2-9 are made in the same general manner, except that the proportions of capping agents are changed in each case, as indicated in Table 1 below.

Comparative Toughener A is made in the same general manner, except that all of the terminal isocyanate groups are capped with o-allyl phenol. Comparative Toughener B is made in the same general manner, except that all of the terminal isocyanate groups are capped with 2-hydroxylethylmethacrylate.

Number average and weight average molecular weights for each of the tougheners are determined by gel permeation chromatography. The capping groups, molecular weights and polydispersity ($M_w/M_n$) for each of toughener Examples 1-9 and Comparative Tougheners A and B are reported in Table 1.

TABLE 1

| Ex. or Comp. Samp. No. | % HEMA[1] capping, mol-% | % o-allyl phenol capping, mol-% | $M_n$[2] | $M_w$[2] | PDI[2] |
|---|---|---|---|---|---|
| A* | 0 | 100 | 5025 | 11,100 | 2.21 |
| 1 | 1.5 | 98.5 | 5430 | 11,610 | 2.14 |
| 2 | 5 | 95 | 5720 | 11,740 | 2.05 |
| 3 | 10 | 90 | 5375 | 11,660 | 2.17 |
| 4 | 20 | 80 | 5910 | 12,060 | 2.05 |
| 5 | 50 | 50 | 5715 | 11,590 | 2.03 |
| 6 | 80 | 20 | 6335 | 11,790 | 1.86 |
| 7 | 90 | 10 | 5610 | 10,930 | 1.95 |
| 8 | 95 | 5 | 5960 | 11,190 | 1.88 |
| 9 | 98.5 | 1.5 | 5950 | 11,170 | 1.88 |
| B* | 100 | 0 | 5835 | 10,610 | 1.82 |

*Not an example of this invention.
[1]HEMA is 2-hydroxymethylmethacrylate.
[2]$M_n$ is number average molecular weight of the toughener;
$M_w$ is weight average molecular weight of the toughener;
PDI is polydispersity, $M_w/M_n$.
Molecular weights are by GPC.

The data in Table 1 indicates that the various tougheners are all very similar in molecular weight. There is a trend towards higher polydispersity with greater o-allyl phenol capping levels.

ADHESIVE EXAMPLES A1-A9 AND COMPARATIVE ADHESIVES C-A AND C-B

One-part, heat activated adhesive formulations are prepared from each of Toughener Examples 1-9 and Comparative Tougheners A and B, using the following formulation:

| Component | Parts By Weight |
|---|---|
| Diglycidyl ether of bisphenol A | 54.5 |
| Epoxy-terminated rubber[1] | 13.8 |
| Toughener | 13.8 |
| Dicyandiamide | 4.3 |
| Accelerator[2] | 1.3 |
| Fumed Silica | 5.4 |
| Fillers/Colorants | 5.1 |
| Versatic Acid monoepoxy ester[3] | 1.3 |
| Glycidyl silyl ether | 0.8 |

[1]An adduct of a carboxyl-terminated butadiene-acrylonitrile rubber (Hycar™ X13), bisphenol A based epoxy resin and cashew nut oil.
[2]Tris (2,4,6-dimethylaminomethyl)phenol in a poly(vinylphenol) matrix.
[3]Cardura™ E10, available from Christ Chemie.

Adhesive Examples A1-A9 contain Toughener Examples 1-9, respectively. Comparative Adhesive C-A contains Toughener A and Comparative Adhesive C-B contains Toughener B.

Impact peel testing is performed in accordance with ISO 11343 wedge impact method. Testing is performed at an operating speed of 2 m/sec. Impact peel testing is performed at 23° C., and strength in N/mm is measured.

Test coupons for the impact peel testing are 90 mm×20 mm with a bonded area of 30×20 mm. The samples are prepared by wiping them with acetone. A 0.15 mm×10 mm wide Teflon tape is applied to the coupons to define the bond area. The structural adhesive is then applied to the bond area of latter coupon and squeezed onto the first coupon to prepare each test specimen. The adhesive layer is 0.2 mm thick. Duplicate samples are cured for 30 minutes at 180° C.

Duplicate test coupons are prepared and are evaluated for lap shear strength in accordance with DIN EN 1465. Testing is performed at a test speed of 10 mm/minute. Testing is performed at 23° C. Test samples are prepared using each adhesive. The bonded area in each case is 25×10 mm. The adhesive layer is 0.2 mm thick. Duplicate test specimens are cured at for 30 minutes at 180° C.

Results of lap shear strength an impact peel strength testing on oily cold rolled steel substrates (1.5 mm thick CRS1403 steel coated with Renoform MCO 3028 oil (Fuchs)) are indicated in Table 2. In this and the following examples, failure mode is described as "BF" ("boundary failure"), which is a cohesive failure close to the surface of the substrate or as "CF" (cohesive failure). Samples which exhibit a mixed failure mode are described by the percentage of each type of failure mode that is seen.

TABLE 2 testing on oily cold rolled steel substrates

| Ex. or Comp. Sample No. | %-HEMA[1] capping, mol-% | Lap Shear Str. (MPa) | Lap Shear Failure Mode | Impact Peel Str. (N/mm) | Impact Peel Failure Mode |
|---|---|---|---|---|---|
| C-A | 0 | 31 | CF[2] | 41 | 18% CF/82% BF |
| 1 | 1.5 | 31 | CF | 43 | 67% CF/33% BF |
| 2 | 5 | 28 | CF | 45 | 60% CF/40% BF |
| 3 | 10 | 29 | CF | 36 | 35% CF/65% BF |
| 4 | 20 | 26 | CF | 31 | 37% CF/63% BF |
| 5 | 50 | 17 | BF[2] | 0.4 | BF |
| 6 | 80 | 11 | BF | 0.4 | BF |
| 7 | 90 | 11 | BF | 0.5 | BF |
| 8 | 95 | 10 | BF | 0.6 | BF |
| 9 | 98.5 | 11 | BF | 0.4 | BF |
| C-B | 100 | 10 | BF | 0.3 | BF |

[1]HEMA is 2-hydroxyethylmethacrylate.

The data in Table 2 indicates that on an oily cold rolled steel substrate, the presence of some phenol capping in all cases increases impact steel strength (relative to Comparative Sample C-B). Lap shear strength is increased relative to Comparative Sample C-B in all cases in which 50% or more of the terminal isocyanate groups are capped with the phenol.

Cohesive failure mode is improved in the lap shear test, relative to both Comparative Samples C-A and C-B, when from 1.5 to 20% of the terminal isocyanate groups on the toughener are capped with 2-hydroxyethylmethacrylate.

In addition, impact peel strength is increased dramatically relative to Comparative Sample C-B when from 1.5 to 20% of the terminal groups on the toughener are capped with 2-hydroxyethylmethacryate. The impact peel strength is also better than in Comparative Sample C-A, when from 1.5 to 5% of the terminal isocyanate groups on the toughener are capped with 2-hydroxyethylmethacrylate.

When evaluated on a 0.8-mm oily hot dip galvanized steel substrate (H340 LAD+Z, MCO 3028 oil), and on an a 1.3-mm aluminum (AC 120, surface pretreated with Bonder 299) substrate, Adhesive Examples 1 and 2 perform very similarly to Comparative Adhesive C-A in both lap shear and impact peel strength testings.

What is claimed is:
1. A one-part structural adhesive, comprising:
A) at least one epoxy resin including at least one diglycidyl ether of a polyhydric phenol;
B) 8 to 30 weight percent of an elastomeric toughener containing urethane and/or urea groups, and which has capped terminal isocyanate groups, wherein from 80 to 99% of the isocyanate groups are capped with a phenol and from 1 to 20% of the isocyanate groups are capped with at least one hydroxy-functional acrylate or a hydroxy-functional methacrylate compound;
C) one or more epoxy curing agents;

D) a liquid rubber-modified epoxy resin, a core-shell rubber or both a liquid rubber-modified epoxy resin and a core-shell rubber;
E) a curing agent
F) a catalyst, and
G) a latent free radical initiator that is activated by radiation or by heating to a temperature of from 80 to 130° C.,
wherein the adhesive cures rapidly at a temperature of 140° C. or higher but slowly if at all at a temperature of 80° C. or lower.

2. The structural adhesive of claim 1, which further contains at least one monomeric or oligomeric, addition polymerizable, ethylenically unsaturated material having a molecular weight of less than about 1500.

3. A method comprising applying the structural adhesive of claim 1 to the surfaces of two metal members, and curing the structural adhesive to form an adhesive bond between the two metal members, wherein the curing is performed by first heating the structural adhesive to radiation or a first temperature sufficient to effect a free radical polymerization of ethylenically unsaturated groups and partially cure the adhesive, and then heating the partially cured structural adhesive to a higher second temperature at which the epoxide groups react with the epoxy curing agent.

* * * * *